United States Patent
Okabe et al.

(10) Patent No.: US 9,602,201 B2
(45) Date of Patent: Mar. 21, 2017

(54) OPTICAL MULTIPLEXING DEVICE AND METHOD OF GENERATING OPTICAL OFDM SIGNAL

(71) Applicant: FUJITSU LIMITED, Kawasaki-shi, Kanagawa (JP)

(72) Inventors: Ryou Okabe, Shinagawa (JP); Shigeki Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 73 days.

(21) Appl. No.: 14/672,527

(22) Filed: Mar. 30, 2015

(65) Prior Publication Data
US 2015/0333827 A1  Nov. 19, 2015

(30) Foreign Application Priority Data
May 15, 2014  (JP) ................. 2014-101374

(51) Int. Cl.
| H04J 14/02 | (2006.01) |
| H04B 10/079 | (2013.01) |
| H04B 10/50 | (2013.01) |

(52) U.S. Cl.
CPC ... H04B 10/07955 (2013.01); H04B 10/5057 (2013.01); H04J 14/02 (2013.01); H04J 14/0298 (2013.01)

(58) Field of Classification Search
CPC .............. H04B 10/07955; H04J 14/0298
See application file for complete search history.

(56) References Cited

U.S. PATENT DOCUMENTS

| 5,943,606 A * | 8/1999 | Kremm ................. H04B 7/1855 342/358 |
| 9,094,842 B2 * | 7/2015 | Geile ....................... G06F 17/14 |
| 2003/0184838 A1* | 10/2003 | Akiyama .............. G02F 1/0121 359/239 |
| 2014/0119725 A1* | 5/2014 | Kato .................... G06F 13/1689 398/25 |

FOREIGN PATENT DOCUMENTS

| EP | 2 725 725 A1 | 4/2014 |
| GB | 2 382 937 A | 6/2003 |

OTHER PUBLICATIONS

Extended European Search Report issued Jul. 24, 2015 in corresponding European Patent Application No. 15160766.0.
(Continued)

Primary Examiner — Dzung Tran
(74) Attorney, Agent, or Firm — Staas & Halsey LLP

(57) ABSTRACT

An optical multiplexing includes: a monitor configured to detect power of an optical component including a frequency component of a cross point between spectra of a first sub-carrier signal and a second sub-carrier signal; and a controller configured to control a modulation timing of a data symbol of the second sub-carrier signal according to the power detected by the monitor, wherein the second sub-carrier signal is multiplexed to a carrier to be adjacent to the first sub-carrier signal multiplexed to the carrier so as to generate an optical Orthogonal Frequency Divisional Multiplexing (OFDM) signal in which an interference between the first and second sub-carrier signals is suppressed.

7 Claims, 13 Drawing Sheets

(56) References Cited

OTHER PUBLICATIONS

Robert Elschner et al., "Distributed Ultradense Optical Frequency-Division Multiplexing Using Fiber Nonlinearity", Journal of Lightwave Technology, vol. 31, No. 4, Feb. 15, 2013, pp. 628-633.
Robert Elschner, Thomas Richter, Tomoyuki Kato, Shigeki Watanabe, Colja Schubert, "Distributed Coherent Optical OFDM Multiplexing Using Fiber Frequency Conversion and Free-Running Lasers," *National Fiber Optic Engineers Conference 2012*, PDP5C. 8, Mar. 2012.

* cited by examiner

OPTICAL MULTIPLEXING DEVICE AND METHOD OF GENERATING OPTICAL OFDM SIGNAL

CROSS-REFERENCE TO RELATED APPLICATION

This application is based upon and claims the benefit of priority of the prior Japanese Patent Application No. 2014-101374 filed on May 15, 2014, the entire contents of which are incorporated herein by reference.

FIELD

The embodiments discussed herein are related to an optical multiplexing device and a method of generating an optical OFDM (Orthogonal Frequency Divisional Multiplexer) signal.

BACKGROUND

A technique for multiplexing optical signals with a high density is studied so as to maximally utilize a transmission band of an optical fiber with an increase in demands for communication. As such a technique, for example, a Nyquist wavelength multiplexing system and a Coherent Optical-Orthogonal Frequency Divisional Multiplexer (CO-OFDM) system exist.

In the CO-OFDM system, interference between sub-carrier signals is suppressed by utilizing orthogonality between sub-carrier signals in which spectra thereof are adjacent to each other on a frequency axis. Thus, the CO-OFDM system, since sub-carrier signals of a high density may be multiplexed in a narrow frequency band, is expected to be a realizing unit of a theoretical limit (for example, 1 (bit/Hz) in a case of a binary code (intensity modulation system)) of a frequency utilization efficiency.

It is desirable to control a center frequency of each sub-carrier signal with high accuracy for generating a multiplexed optical signal (optical OFDM signal) multiplexed by the CO-OFDM system so that a spacing between the center frequencies of adjacent sub-carrier signals is equal to a symbol rate (baud rate) of the modulation.

Meanwhile, for example, a frequency control unit having a high accuracy that uses Single Side Band (SSB) modulation and Cross Phase Modulation (XPM) that is a nonlinear optical effect in an optical fiber is described in "Robert Elschner, Thomas Richter, Tomoyuki Kato, Shigeki Watanabe, Colja Schubert, *Distributed Coherent Optical OFDM Multiplexing Using Fiber Frequency Conversion and Free-Running Lasers*", OFC/NFOEC 2012, PDP5C.8, 2012".

SUMMARY

According to an aspect of the invention, an optical multiplexing includes: a monitor configured to detect power of an optical component including a frequency component of a cross point between spectra of a first sub-carrier signal and a second sub-carrier signal; and a controller configured to control a modulation timing of a data symbol of the second sub-carrier signal according to the power detected by the monitor, wherein the second sub-carrier signal is multiplexed to a carrier to be adjacent to the first sub-carrier signal multiplexed to the carrier so as to generate an optical Orthogonal Frequency Divisional Multiplexing (OFDM) signal in which an interference between the first and second sub-carrier signals is suppressed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In order to generate an optical OFDM signal, high accurate control of a timing of a data symbol of each sub-carrier signal, that is, a modulation timing to ensure orthogonality between adjacent sub-carrier signals is desired. If a difference is generated in the modulation timing between the sub-carrier signals, interference occurs between adjacent sub-carrier signals in a frequency region in which spectra overlap and communication quality is lowered.

Meanwhile, in order to reduce influence of reflection (multipath) of radio waves by buildings and the like, a symbol rate of a sub-carrier signal of an electric OFDM signal used for wireless communication is suppressed to be lower than the symbol rate of the sub-carrier signal of an optical OFDM signal. Thus, control of the modulation timing and the frequency may be performed in a processing capability of a Digital Signal Processor (DSP) that may be driven by a frequency signal up to several GHz band. A hardware scale is reduced by using the DSP as a unit for generating the OFDM signal.

However, in the CO-OFDM system, in order to realize a large-volume transmission by fully utilizing finite transmission bands of optical fiber, the modulation is performed in a high symbol rate of several GHz different from a case of the wireless communication. Thus, the processing capability desirable for control of the modulation timing and the frequency exceeds the processing capability of the DSP. Consequently, it is difficult to generate the optical OFDM signal using the DSP.

In contrast, as a control unit of the frequency with high accuracy, for example, XPM, SSB modulation, and the like exist, but a control unit of modulation timing of the sub-carrier signal with high accuracy does not exist. Thus, the interference between the sub-carrier signals may not be suppressed.

Hereinafter, an optical multiplexing device capable of generating an optical OFDM signal in which the interference between sub-carrier signals is suppressed and a method of generating the optical OFDM signal are described with reference to the drawings.

Figure 1:
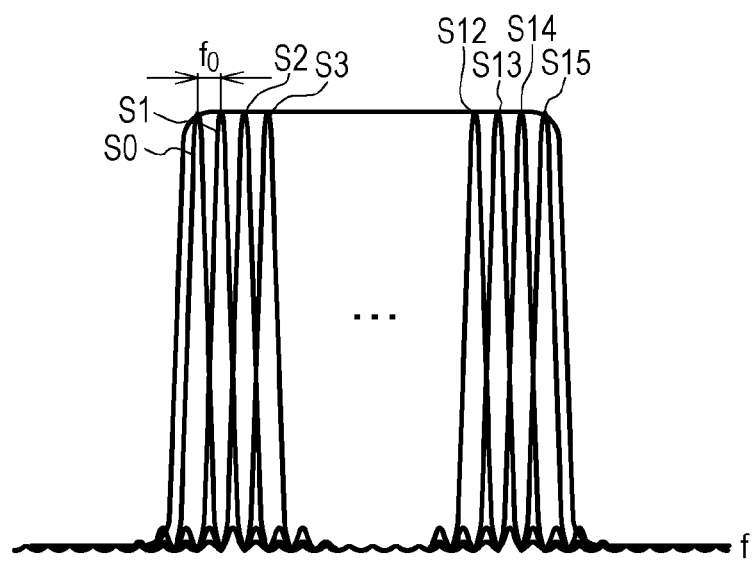
FIG. 1 is a waveform diagram illustrating an example of a spectrum of an optical OFDM signal.

FIG. 1 is a waveform diagram illustrating an example of a spectrum of the optical OFDM signal. The optical OFDM signal is a multi-carrier signal that is obtained by multiplexing a plurality of sub-carrier signals S0 to S15 in which a carrier frequency, that is a center frequency of the carrier, is different to a carrier light. Each of the sub-carrier signals S0 to S15 is arranged on a frequency axis with a spacing (carrier spacing) $f_0$ of the center frequency. Moreover, in the example, the sub-carrier signals S0 to S15 of 16 waves are exemplified, but there is no limit in the number of the sub-carrier signals S0 to S15.

The sub-carrier signals S0 to S15 of which spectra are adjacent to each other on the frequency axis satisfy an orthogonal condition represented by the following Equations (1) to (3). Here, m and n are integers and $T=1/f_0$.

$$\int_0^T \cos(2\pi m f_0 t)\cos(2\pi n f_0 t)dt = \begin{cases} \frac{T}{2} & (m=n) \\ 0 & (m \neq n) \end{cases} \quad (1)$$

$$\int_0^T \sin(2\pi m f_0 t)\sin(2\pi n f_0 t)dt = \begin{cases} \frac{T}{2} & (m=n) \\ 0 & (m \neq n) \end{cases} \quad (2)$$

$$\int_0^T \cos(2\pi m f_0 t)\sin(2\pi n f_0 t)dt = 0 \quad (3)$$

A sub-carrier signal Sn (n=0, 1, 2, . . . , 15) is a digital signal in which a carrier frequency is $nf_0$ and a symbol length $T=1/f_0$. A waveform of the sub-carrier signal Sn for one symbol existing at time t=0 to T is represented by Expression (4) using values an and bn of the data symbols.

$$a_n \cos(2\pi n f_0 t) - b_n \sin(2\pi n f_0 t) \quad (4)$$

Figure 2:
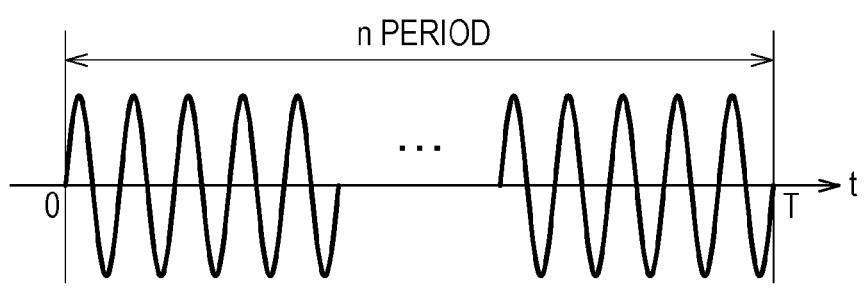
FIG. 2 is a waveform diagram illustrating an example of a sub-carrier signal.

FIG. 2 is a waveform diagram illustrating an example of the sub-carrier signal Sn. Since $T=1/f_0$, sine waves of n cycles are present in the symbol length T. An amplitude and a phase of the sine wave are changed for each symbol according to the values an and bn of the data symbols.

The optical OFDM signal of a baseband is generated by combining the sub-carrier signals S0 to S15 at the same timing. Thus, a waveform Sb(t) of the optical OFDM signal of the baseband is a total of a value of Expression (4) in which n=0 to N−1 (N: an integer (16 in the example)) as the following Equation (5).

$$S_b(t) = \Sigma_{n=0}^{N-1}\{a_n \cos(2\pi n f_0 t) - b_n \sin(2\pi n f_0 t)\} \quad (5)$$

Figure 3:
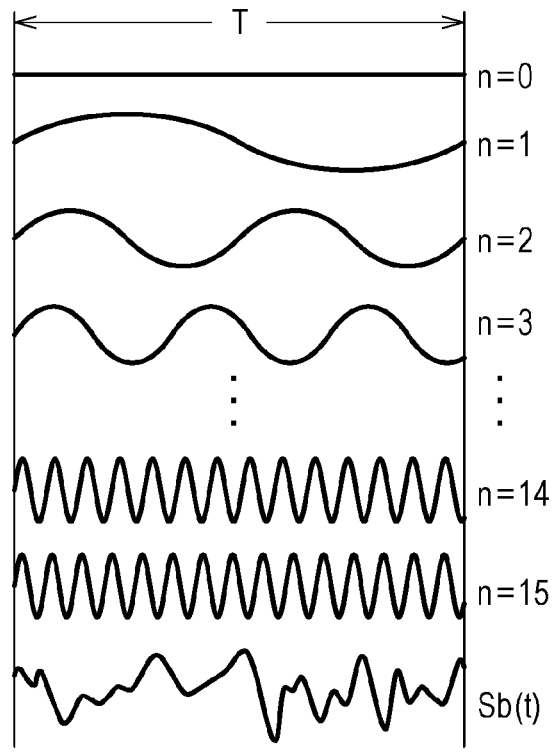
FIG. 3 is a waveform diagram illustrating an example of an optical OFDM signal.

FIG. 3 is a waveform diagram illustrating an example of the optical OFDM signal. The waveform Sb(t) is formed by combining a plurality of digital modulation signals (n=0 to 15) in which a carrier frequency $nf_0$ is different, that is, the sub-carrier signals S0 to S15 and has a form of a multi-carrier modulation signal. In the optical OFDM signal, not only the spacing $f_0$ of the center frequency may be fixed, but also it is a condition that timing of the data symbol modulated to the sub-carrier signals S0 to S15 is matched to suppress interference between sub-carrier signals.

Furthermore, the optical OFDM signal is frequency-converted depending on a usable frequency band. A waveform S(t) of the frequency-converted optical OFDM signal is represented by the following Equation (6).

$$S(t) = \Sigma_{n=0}^{N-1}[a_n \cos\{2\pi(f_c+nf_0)t\} - b_n \sin\{2\pi(f_c+nf_0)t\}] \quad (6)$$

Here, $f_c$ is a frequency that is a reference in a carrier band and is the lowest carrier frequency of carrier frequencies $f_c$ to $f_c+(N-1)f_0$ of the sub-carrier signals S0 to S15.

Figure 4:
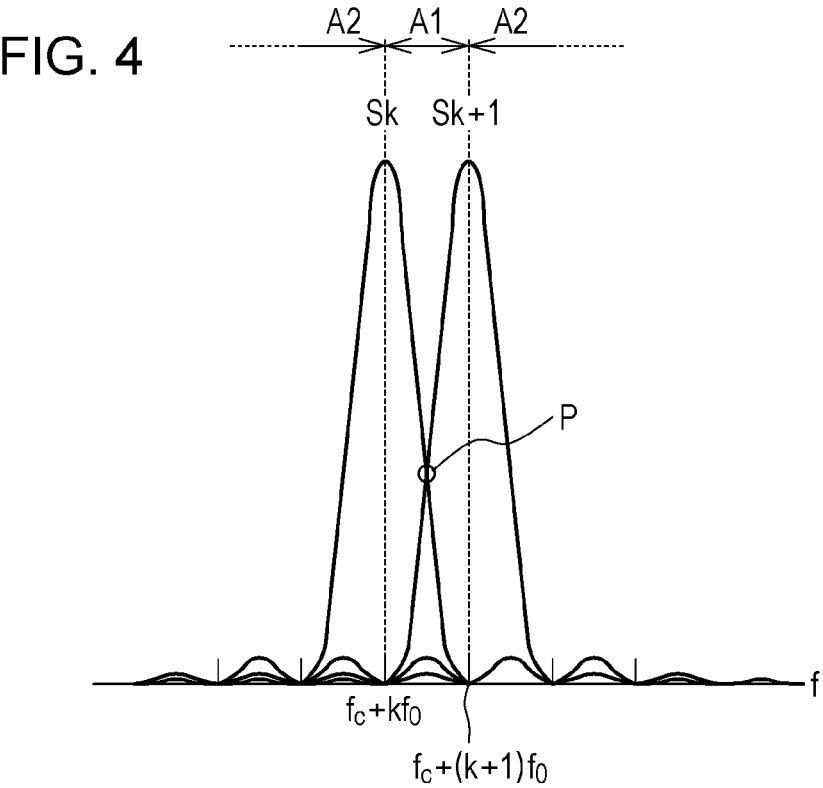
FIG. 4 is a waveform diagram illustrating an example of spectra of adjacent sub-carrier signals.

FIG. 4 is a waveform diagram illustrating an example of spectra of adjacent sub-carrier signals Sk and Sk+1 (k: an integer). In FIG. 4, as an example, the sub-carrier signal Sk in which a center frequency is $f_c+kf_0$ and the sub-carrier signal Sk+1 in which a center frequency is $f_c+(k+1)f_0$ are illustrated.

The spectrum of each of the sub-carrier signals Sk and Sk+1 has a symmetrical waveform about the center frequencies $f_c+kf_0$ and $f_c+(k+1)f_0$. Power of each of the sub-carrier signals Sk and Sk+1 decreases while oscillating with a period $f_0$ as being separated from the center frequencies $f_c+kf_0$ and $f_c+(k+1)f_0$.

Thus, in one of the center frequencies $f_c+kf_0$ and $f_c+(k+1)f_0$ of one of the sub-carrier signals Sk and Sk+1, a size of the other of the sub-carrier signals Sk+1 and Sk is 0. That is, when the size of one of the sub-carrier signals Sk and Sk+1 is the maximum value, the size of the other is 0 (minimum value). Thus, the interference between the sub-carrier signals Sk and Sk+1 is suppressed.

However, even if the orthogonal condition regarding the center frequency described above is satisfied, if a difference (difference in a modulation timing) in a timing of the data symbol between the sub-carrier signals Sk and Sk+1 is present, the sub-carrier signals Sk and Sk+1 interfere each other. Particularly, in a region A1 between center frequencies $f_c+kf_0$ and $f_c+(k+1)f_0$ in which overlap between the spectra is significant, interference light is significantly generated. Moreover, the interference light is almost not present in a region A2 outside of the center frequencies $f_c+kf_0$ and $f_c+(k+1)f_0$ in which the overlap is almost not present between the spectra.

When the interference light is generated, power of a cross point (intersecting position) P between the spectra of the sub-carrier signals Sk and Sk+1 is significantly increased in the region A1. Meanwhile, when the interference light is not generated, the power of the cross point P becomes the minimum value. As described above, the interference light is generated depending on the difference in the modulation timing.

Figure 5A:
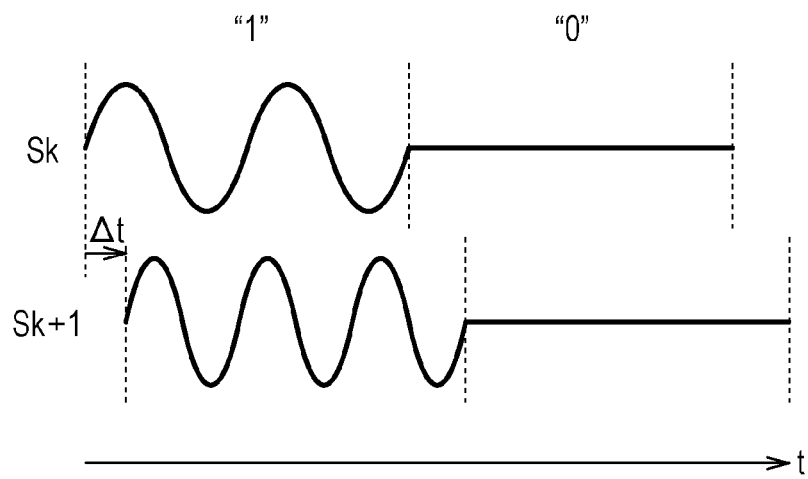
FIGS. 5A and 5B are diagrams illustrating a timing difference of data symbols and a change in power of a cross point with respect to the timing difference.
Figure 5B:
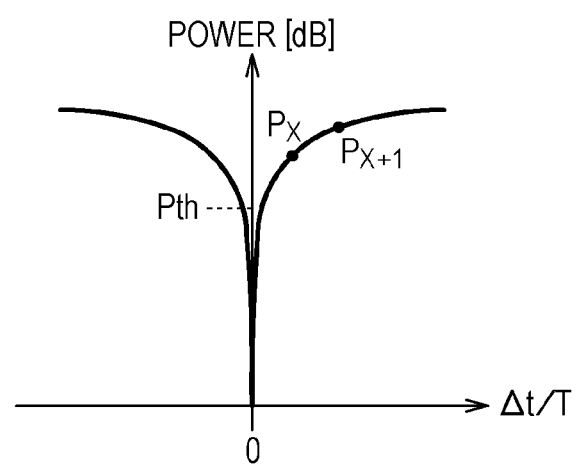

FIGS. 5A and 5B respectively illustrate a timing difference of the data symbol and a change in the power of cross point with respect to the timing difference. As an example, FIG. 5A illustrates waveforms of the sub-carrier signals Sk and Sk+1 that are modulated in data "1" and "0" (binary digit) by intensity modulation when a horizontal axis is a time t. The timing of the data symbol of the sub-carrier signal Sk+1 is delayed by Δt more than that of the sub-carrier signal Sk.

In FIG. 5B, the horizontal axis illustrates a timing difference Δt/T that is normalized in a period T and the vertical axis illustrates power (dB) of the cross point P. When Δt/T=0, that is, if a shift of the timing of the data symbol between the sub-carrier signals Sk and Sk+1 is not present, the power of the cross point P represents the minimum value. In contrast, when Δt/T>0, that is, if the shift of the timing of the data symbol between the sub-carrier signals Sk and Sk+1 is present, the power of the cross point P represents a large value as an absolute value of the timing difference Δt is increased.

An optical multiplexing device of an embodiment controls the modulation timing so that the power of the cross point P described above is the minimum value. More specifically, the optical multiplexing device samples powers $P_X$ and $P_{X+1}$ of the cross point P while changing the modulation timing and thereby the modulation timing in which the power of the cross point P is the minimum value is detected. Furthermore, an optical multiplexing device of another embodiment detects the modulation timing in which the powers $P_X$ and $P_{X+1}$ of the cross point P is below a predetermined threshold Pth while changing the modulation timing. Thus, the optical OFDM signal in which the interference between the sub-carrier signals is suppressed is generated. Hereinafter, a configuration regarding the optical multiplexing device will be described.

Figure 6:
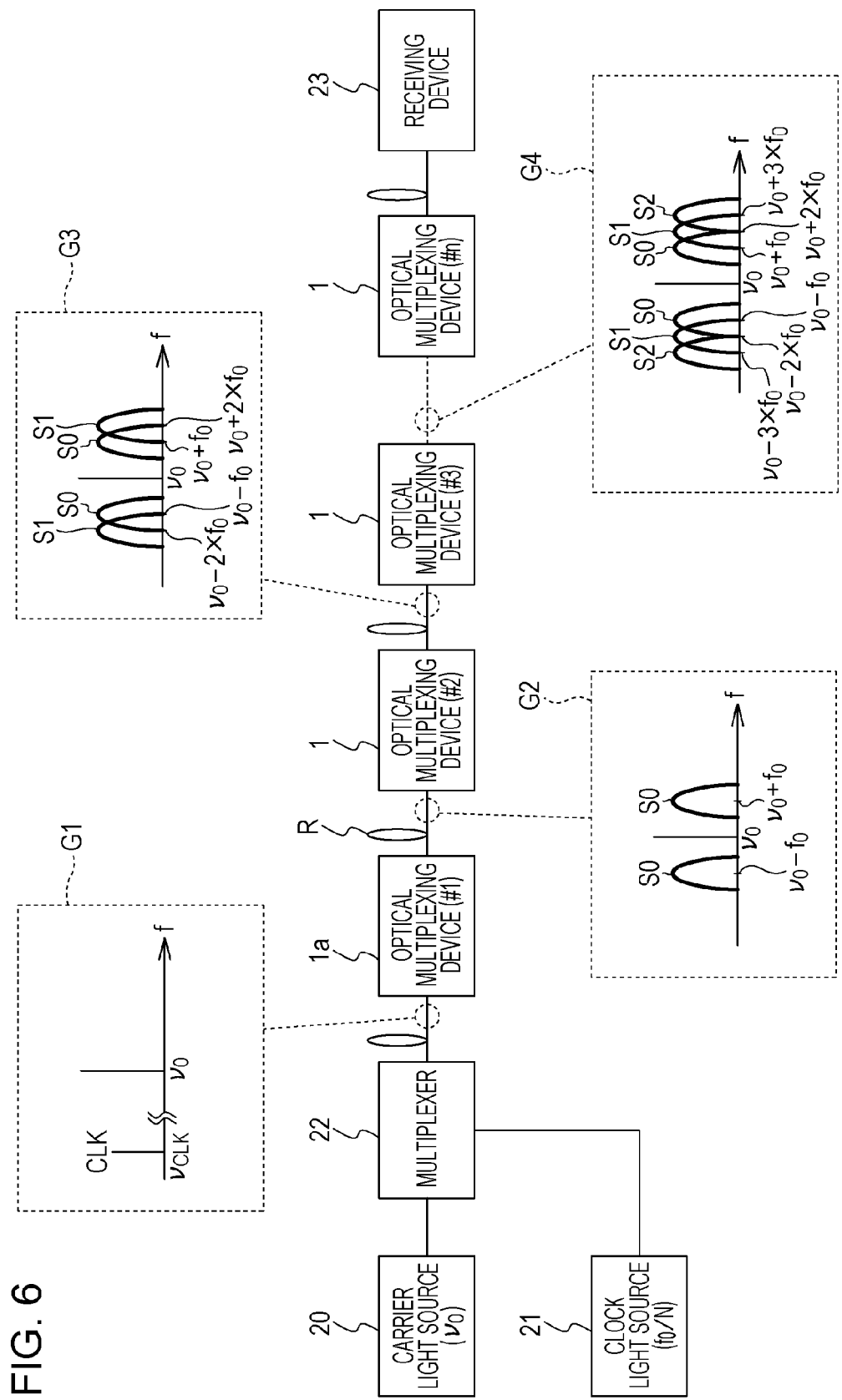
FIG. 6 is a configuration diagram illustrating an example of an optical transmission system using an optical multiplexing device.

FIG. 6 is a configuration diagram illustrating an example of an optical transmission system using the optical multiplexing device. The optical transmission system has a carrier light source 20, a clock light source 21, a multiplexer 22, a plurality of optical multiplexing devices (#1 to #n) 1a and 1 provided on a transmission line (optical fiber) R, and a receiving device 23. Moreover, in FIG. 6, in graphs G1 to G4, an example of an optical spectrum is illustrated in which the horizontal axis is a frequency f.

The carrier light source 20 outputs a continuous wave (CW) having a frequency $v_0$ to the multiplexer 22. The continuous wave is used as the carrier light in which sub-carrier signals S0 to SN−1 of an n wave are multiplexed by the optical multiplexing devices (#1 to #n) 1a and 1 of the subsequent stage.

The clock light source 21 outputs a pulse light of a frequency $v_{CLK}$ modulated in a sine wave of a repetition frequency $f_0/N$ to the multiplexer 22. The pulse light is used for an optical clock signal CLK to synchronously generate the sub-carrier signals S0 to SN−1 by the optical multiplexing devices (#1 to #n) 1a and 1 of the subsequent stage.

The multiplexer 22 multiplexes a carrier light $v_0$ and the optical clock signal CLK. For example, the multiplexer 22 is an optical coupler. The carrier light $v_0$ and the optical clock signal CLK are multiplexed by the multiplexer 22 and are output to a transmission line R (see graph G1).

The optical multiplexing device (#1) 1a multiplexes the sub-carrier signal S0 to the carrier light $v_0$ (see graph G2). The optical multiplexing devices (#2 to #n) 1 sequentially multiplexes the sub-carrier signals S1 to SN−1 to the carrier light in which the sub-carrier signal S0 is multiplexed (see the graphs G3 and G4). The optical multiplexing devices (#2 to #n) 1 respectively multiplex the sub-carrier signals S1 to SN−1 to the carrier light $v_0$ so that an orthogonal relationship of the frequency is established between the sub-carrier signals S0 to SN−1. Thus, the optical OFDM signal in which the sub-carrier signals S0 to SN−1 are multiplexed is generated.

The receiving device 23 detects the sub-carrier signals S0 to SN−1 from the optical OFDM signal in a locally emitted light. As a detection unit, for example, homodyne detection or heterodyne detection may be exemplified.

Figure 7:
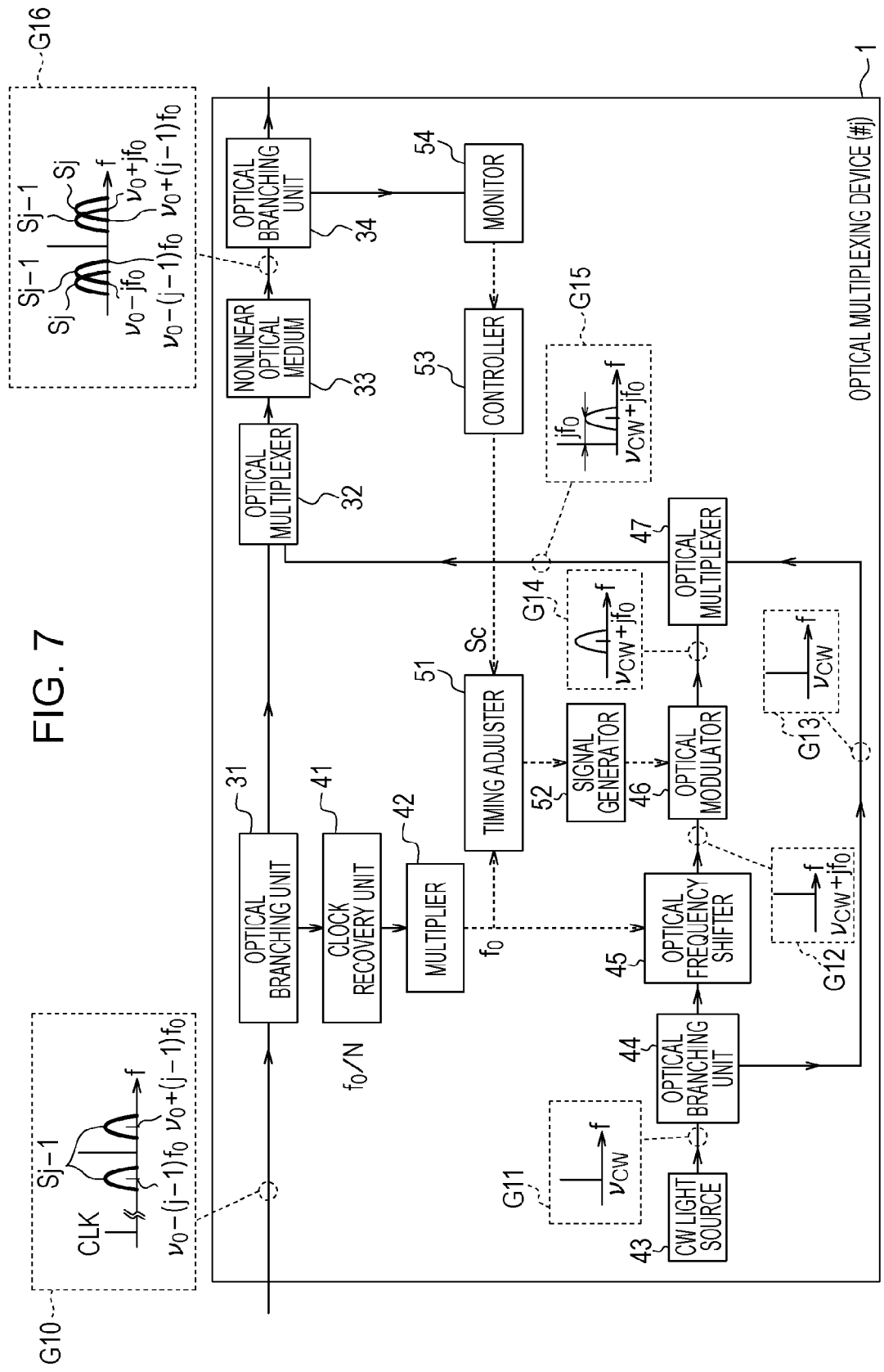
FIG. 7 is a configuration diagram of the optical multiplexing device according to an embodiment.

FIG. 7 is a configuration diagram of an optical multiplexing device (#j) 1 (j=2, 3, ..., n) according to an embodiment. In graphs G10 to G16 in FIG. 7, an example of the optical spectrum is illustrated in which the horizontal axis is the frequency f. Moreover, in FIG. 7, a solid line illustrates a path of the optical signal and a dotted line illustrates a path of an electrical signal.

The optical multiplexing device (#j) 1 has optical branching units 31, 34, and 44, optical multiplexers 32 and 47, a nonlinear optical medium 33, a clock recovery section 41, a multiplier 42, a CW light source 43, an optical frequency shifter 45, and an optical modulator 46. For example, each of the optical branching units 31, 34, and 44 is an optical splitter. The optical multiplexing device (#j) 1 further has a timing adjuster 51, a signal generator 52, a controller (control section) 53, and a monitor (detection section) 54. Moreover, for example, the optical multiplexing device (#1) 1a has a configuration that is formed by excepting the optical branching unit 34, the controller 53 and the monitor 54 from the other optical multiplexing device (#j) 1.

In the optical multiplexing device (#j) 1, the carrier light $v_0$ in which a sub-carrier signal (first sub-carrier signal) Sj−1 is multiplexed and a multiplexed light of the optical clock signal CLK are input from the transmission line R (see the graph G10). The sub-carrier signal Sj−1 is a signal that is multiplexed to the carrier light by the optical multiplexing devices (#1 to #n−1) 1a and 1 of the previous stage. The optical multiplexing device (#j) 1 multiplexes a sub-carrier signal (second sub-carrier signal) Sj adjacent to the sub-carrier signal Sj−1 to the carrier light $v_0$. That is, the optical multiplexing device (#j) 1 multiplexes the sub-carrier signal Sj so as to be adjacent to the sub-carrier signal Sj−1 thereby generating the optical OFDM signal.

The optical branching unit 31 power-branches the multiplexed light input from the transmission line R and outputs the branched light to the clock recovery section 41 and the optical multiplexer 32. The clock recovery section 41 extracts the optical clock signal CLK from the multiplexed light, converts the optical clock signal CLK into an electrical clock signal of a frequency $f_0/N$, and outputs the electrical clock signal to the multiplier 42. The multiplier 42 generates the electrical clock signal of the frequency $f_0$ by multiplying the frequency by N of the electrical clock signal and outputs the electrical clock signal to the timing adjuster 51 and the optical frequency shifter 45.

The CW light source 43 outputs the continuous wave of a frequency $v_{CW}$ to the optical branching unit 44 (see the graph G11). The sub-carrier signal Sj is generated based on the continuous wave of the frequency $v_{CW}$. For example, the optical branching unit 44 power branches the continuous wave and outputs the branched continuous wave to the optical frequency shifter 45 and the optical multiplexer 47 (see the graph G13).

The optical frequency shifter 45 converts the continuous wave of the frequency $v_{CW}$ input from the CW light source 43 into a continuous wave of a frequency $v_{CW}+jf_0$ based on the electrical clock signal of the frequency $f_0$ input form the multiplier 42 (see the graph G12). As the optical frequency shifter 45, a SSB modulator or an optical frequency comb generator is used.

The optical frequency comb generator is, for example, a Mach-Zehnder modulator and generates an optical frequency comb. The optical frequency comb is an optical spectrum group having a certain frequency spacing ($f_0$). When using the optical frequency comb generator as the optical frequency shifter 45, for example, the continuous wave of the frequency $v_{CW}$ is converted into the continuous wave of the frequency $v_{CW}+jf_0$ by extracting the optical component of the frequency $v_{CW}+jf_0$ from the optical frequency comb by the optical filter.

The timing adjuster 51 instructs an output timing of a data signal to the signal generator 52 based on the electrical clock signal of the frequency $f_0$ input from the multiplier 42. Furthermore, the timing adjuster 51 gives a delay time to the output timing of the data signal based on a control signal Sc input from the controller 53. Further specifically, the timing adjuster 51 adjusts a phase of the clock signal based on the control signal Sc and outputs the phase of the adjusted clock signal to the signal generator 52.

The signal generator 52 outputs the data signal to the optical modulator 46 according to the output timing instructed from the timing adjuster 51. For example, the signal generator 52 generates the data signal to be transmitted in synchronization with the clock signal input from the timing adjuster 51.

The optical modulator 46 modulates the continuous wave of the frequency $v_{CW}+jf_0$ input from the optical frequency shifter 45 with a symbol rate B equal to the frequency $f_0$ based on the data signal input from the signal generator 52 (see the graph G14). In order to realize a large capacity transmission by maximally utilizing the transmission band of a finite optical fiber (transmission line R), the optical modulator 46 performs the modulation in a high symbol rate $B(f_0)$ of a few tens GHz different from a case of the wireless communication.

As a modulation system, a multi-level modulation system such as intensity modulation, Quadrature Phase Shift Keying (QPSK), and Quadrature Amplitude Modulation (QAM) is exemplified. As the optical modulator 46, for example, LN (LiNbO3) modulator is used.

The light that is modulated by the optical modulator 46 is input into the optical multiplexer 47 and is multiplexed with the continuous wave of the frequency $v_{CW}$ output from the CW light source 43. Thus, an optical beat signal having a difference frequency of a frequency spacing $jf_0$ is generated (see the graph G15). The optical beat signal is input into the optical multiplexer 32 connected to the transmission line R.

The carrier light $v_0$ in which the sub-carrier signal Sj−1 is multiplexed and the optical beat signal are multiplexed by the optical multiplexer 32 and are input into the nonlinear optical medium 33 connected to the transmission line R. Thus, since Cross Phase Modulation (XPM) is generated in the nonlinear optical medium 33, the sub-carrier signal Sj of a frequency $v_0 \pm jf_0$ is multiplexed to the carrier light $v_0$ to which the sub-carrier signal Sj−1 is multiplexed (see the graph G16). Cross phase modulation is one of nonlinear optical effects and a phenomenon that a phase change occurs in the other light wave in proportion to the light intensity of one light wave when two light waves different from each other in the wavelength propagate in the nonlinear optical medium 33.

The nonlinear optical medium 33 is, for example, the optical fiber. As the optical fiber, single-mode fiber, dispersion-shifted fiber, highly nonlinear fiber, photonic crystal fiber, chalcogenide fiber, and the like are exemplified. Furthermore, fiber in which germanium, bismuth, or the like is added to a core so as to increase a refractive index or a waveguide structure, and fiber having a reduced mode field so as to increase an optical power density, or a waveguide structure are also used as the nonlinear optical medium 33.

Furthermore, the nonlinear optical medium 33 is not limited to the optical fiber and may use other devices. For example, a semiconductor optical amplifier having a quantum well structure, a quantum dot semiconductor optical amplifiers, and a silicon photonics waveguide, and the like may be used as the nonlinear optical medium 33.

As described above, the sub-carrier signal Sj is multiplexed to the carrier light $v_0$ at a position separated from the frequency $v_0$ by a difference frequency $jf_0$ of the optical beat signal by inputting the optical beat signal into the nonlinear optical medium 33. The difference frequency $jf_0$ of the optical beat signal is controlled with a high accuracy by the optical frequency shifter 45 such as the SSB modulator and the optical frequency comb generator. Thus, the sub-carrier signal Sj has the center frequency $v_0 \pm jf_0$ and the orthogonal relationship of the frequency is established between the sub-carrier signal Sj and other adjacent sub-carrier signals Sj−1.

As described above, in the optical OFDM signal, the orthogonal relationship of the frequency is not only established between the sub-carrier signals S1 to SN−1, but also the interference occurs between the sub-carrier signals S1 to SN−1 if the timing of the data symbol is not provided to become to match. Thus, in the monitor 54 and the controller 53, the feedback control of the modulation timing is performed with respect to the timing adjuster 51 based on the power of the cross point P described above.

The carrier light $v_0$ to which the sub-carrier signals Sj−1 and Sj are multiplexed is power-branched and output to the optical multiplexing device (#j+1) 1 of the next stage and the monitor 54 by the optical branching unit 34 connected to the nonlinear optical medium 33. The monitor 54 detects the power of the cross point P of the sub-carrier signals Sj−1 and Sj and notifies the power to the controller 53.

The controller 53 controls the timing adjuster 51 based on the power of the cross point P detected by the monitor 54. That is, the controller 53 controls the timing of the data symbol of the sub-carrier signal Sj, that is, the modulation timing depending on the power of the cross point P detected by the monitor 54. Further specifically, the controller 53 outputs the control signal Sc indicating the delay time of output timing of the data signal to the timing adjuster 51 so that the power of the cross point P is the minimum value.

Figure 8:
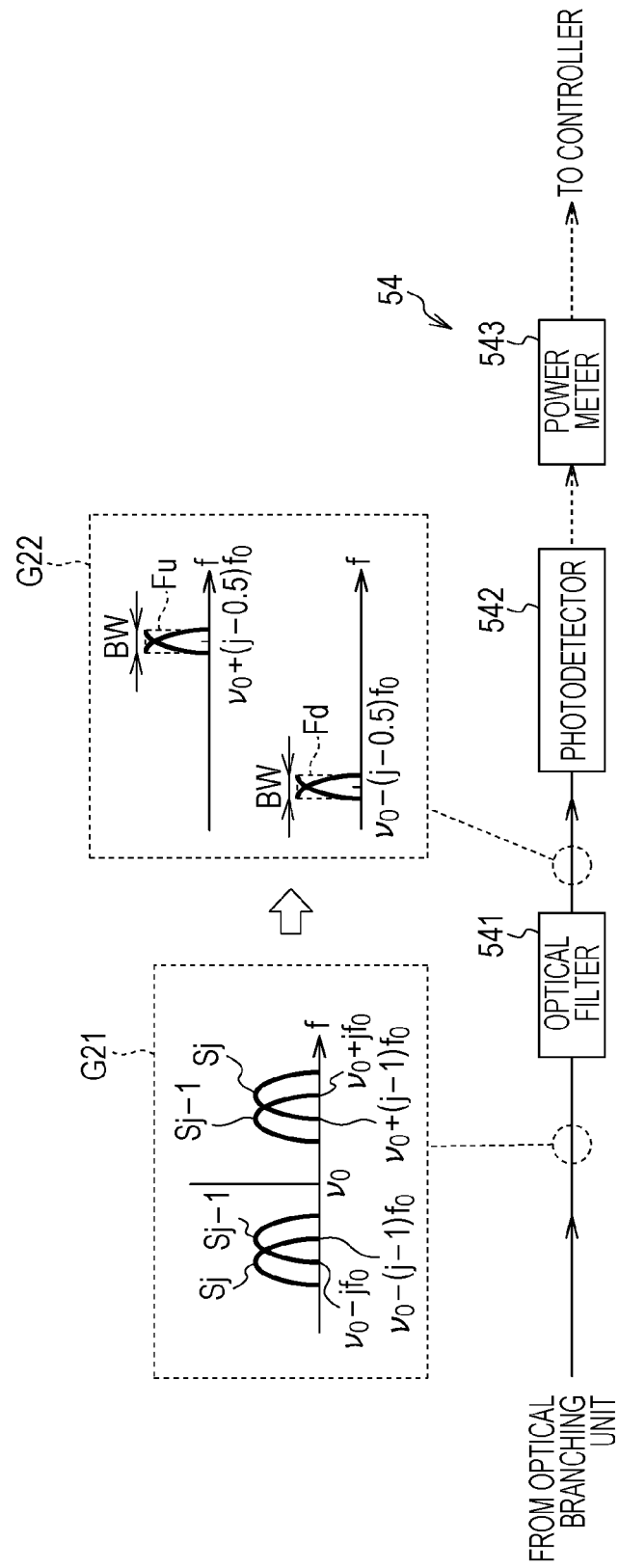
FIG. 8 is a configuration diagram illustrating an example of a monitor.

FIG. 8 is a configuration diagram illustrating an example of the monitor 54. The monitor 54 has an optical filter 541, a photodetector 542, and a power meter 543. Moreover, in FIG. 8, an example of the optical spectrum is illustrated in graphs G21 and 22 in which the horizontal axis is the frequency f.

The carrier light $v_0$ (see the graph G21) to which the sub-carrier signals Sj−1 and Sj are multiplexed is input from the optical branching unit 34 into the optical filter 541. The optical filter 541 extracts optical components Fu and Fd (see the graph G22) including the frequency component of the cross point P between the spectra of the sub-carrier signals Sj−1 and Sj from the carrier light $v_0$ (optical OFDM signal). The optical components Fu and Fd have a bandwidth BW of the symbol rate B or less. As the optical filter 541, a thin film deposition type optical filter or a Fiber Bragg Grating (FBG) type optical filter are used.

The optical filter 541 has a transmission band having a width BW in which a frequency $v_0+(j-0.5)f_0$ or $v_0-(j-0.5)f_0$ of the cross point P of the sub-carrier signals Sj−1 and Sj is the center frequency. Thus, the optical filter 541 extracts the optical component Fu of an upper sideband side or the optical component Fd of a lower sideband side from the carrier light $v_0$. The extracted optical components Fu and Fd are input into the photodetector 542.

The photodetector 542 detects the optical components Fu and Fd extracted by the optical filter 541 and converts the optical components Fu and Fd into an electrical signal. The power meter 543 detects the power of the optical components Fu and Fd based on the electrical signal input from the photodetector 542. That is, the photodetector 542 detects the power of the optical components Fu and Fd transmitted through the optical filter 541. The detected power is notified to the controller 53. As described above, the monitor 54 easily detects the power of the optical components Fu and Fd using the optical filter 541 and the photodetector 542.

As described above, if the timing of the data symbol, that is, the modulation timing is provided to become to match between the sub-carrier signals Sj−1 and Sj, the power of the cross point P of the sub-carrier signals Sj−1 and Sj is the minimum value (see FIGS. 5A and 5B). The controller 53 controls the modulation timing by instructing the delay time to the timing adjuster 51 so that the power detected by the power meter 543 is the minimum value.

Figure 9:
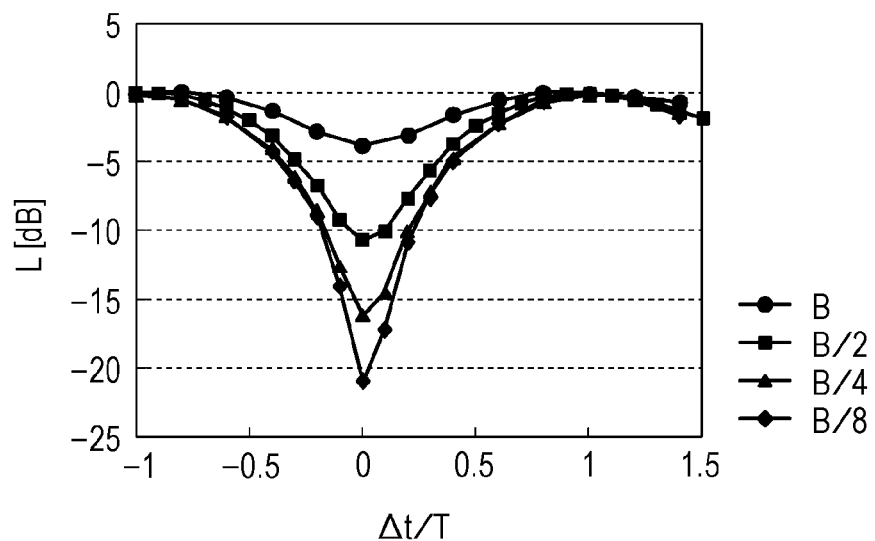
FIG. 9 is a graph illustrating a change in power of a cross point with respect to a timing difference of a data symbol for each transmission band of an optical filter.

FIG. 9 is a graph illustrating a change in the power of the cross point P with respect to a timing difference Δt of the data symbol for each transmission bandwidth BW of the optical filter 541. In FIG. 9, the horizontal axis illustrates the timing difference Δt/T that is normalized in the period T of the symbol rate and the vertical axis illustrates a level ratio L of the power of the cross point P normalized with respect to the maximum value.

The level ratio L represents a ratio of the power of a case where the interference is not present at all with respect to the power (case where the shift is half period T/2) of a case where the interference occurs the most significantly between the sub-carrier signals Sj−1 and Sj. Moreover, the level ratio L is a value that is obtained by calculation in which the modulation system of the sub-carrier signals Sj−1 and Sj is the QPSK and the transmission bandwidths BW of the optical filter 541 are B, B/2, B/4, and B/8.

In the vicinity of the timing difference Δt/T=0, the power of the cross point P represents relatively small value with respect to the maximum value as the transmission bandwidth BW of the optical filter 541 is narrow. Thus, the detection of the minimum value of the power of the cross point P is easily performed as the resolution of frequency of the optical filter 541 is increased. That is, the detection accuracy of the minimum value of the power of the cross point P is improved as the resolution of the frequency of the optical filter 541 is increased. For example, if the transmission bandwidth BW=B, the level ratio L of the power of the cross point P is approximately −4 (dB) and if the transmission bandwidth BW=B/8, the level ratio L of the power of the cross point P is approximately −20 (dB).

As described above, the modulation of the sub-carrier signal Sj is performed, for example, in a high symbol rate $B(f_0)$ of a few tens GHz different from the case of the wireless communication. Thus, even if the power of the cross point P is detected in which the transmission bandwidth BW=B/8, it is possible to use the optical filter 541 in which the bandwidth BW is sufficiently wide.

As described above, for example, the modulation is performed in a high symbol rate $B(f_0)$ of a few tens GHz, since a processing capability that is desirable to control the modulation timing and the frequency exceeds the processing capability of the DSP, it is difficult to generate the optical OFDM signal using the DSP. However, according to the configuration described above, it is possible to control the modulation timing of the sub-carrier signal Sj and generate the optical OFDM signal in which the interference is reduced between the sub-carrier signals Sj−1 and Sj using the optical filter 541 in which the bandwidth BW is sufficiently wide, that is, the optical filter 541 in which the resolution is low.

Moreover, if the transmission bandwidth BW>B, power of the frequency region A2 (see FIG. 4) in which the interference does not occur is included in the power of the cross point P that is detected. The power of the frequency region A2 is fixed in a case where the interference occurs the most significantly between the sub-carrier signals Sj−1 and Sj and a case where the interference is not present at all. Thus, if the transmission bandwidth BW>B, the level ratio L of the power of the cross point P is similar to a case where the transmission bandwidth BW=B. Thus, the minimum value of the power of the cross point P is effectively detected in a range of the transmission bandwidth BW≤B.

Furthermore, in the embodiment, the optical filter 541 extracts the optical components Fu and Fd as the frequencies $v_0+(j-0.5)f_0$ and $v_0-(j-0.5)f_0$ of the cross point P are the center frequencies. That is, since the center frequencies of the optical components Fu and Fd is the frequencies $v_0+(j-0.5)f_0$ and $v_0-(j-0.5)f_0$ of the cross point P, the power of the interference light between the sub-carrier signals Sj−1 and Sj is effectively detected. Thus, the minimum value of the power of the cross point P is detected with a high accuracy.

Figure 10:
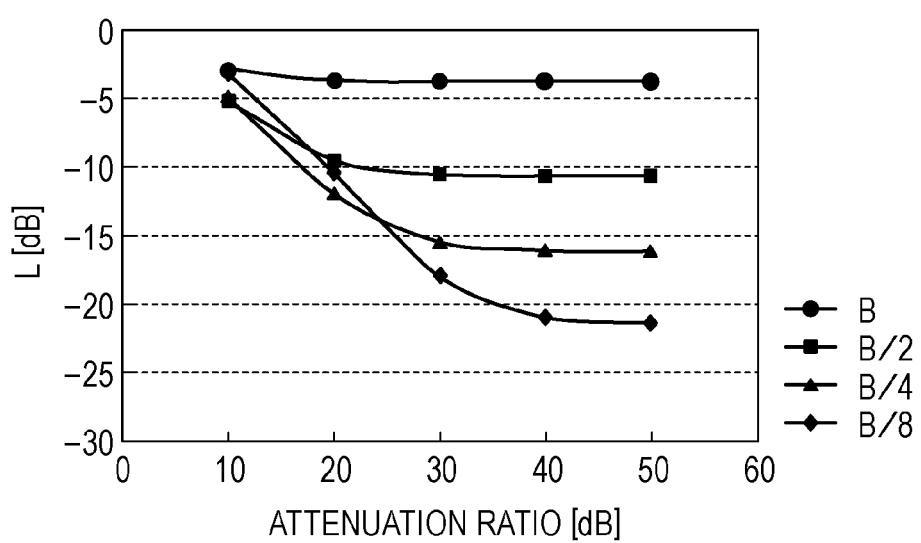
FIG. 10 is a graph illustrating a change in power of a cross point with respect to a damping ratio of the optical filter for each transmission band of the optical filter.

FIG. 10 is a graph illustrating a change in the power of the cross point P with respect to an attenuation ratio of the optical filter 541 for each the transmission bandwidth BW of the optical filter. In FIG. 10, the horizontal axis illustrates the attenuation ratio of the optical filter 541 and the vertical axis illustrates the level ratio L of the power of the cross point P that is normalized with respect to the maximum value. Moreover, the level ratio L is a value that is obtained in calculation in which the modulation system of the sub-carrier signals Sj−1 and Sj is the QPSK and the transmission bandwidths BW of the optical filter 541 are B, B/2, B/4, and B/8.

As illustrated in FIG. 10, when using the optical filter 541 in which the attenuation ratio is approximately 30 (dB) or more, it is possible to sufficiently detect the minimum value of the power of the cross point P.

As described above, according to the configuration illustrated in FIG. 8, even if the modulation of the sub-carrier signals Sj−1 and Sj is performed in the high symbol rate $B(f_0)$ of a few tens GHz, it is possible to detect the minimum value of the power of the cross point P. Meanwhile, if the modulation is performed in a low symbol rate $B(f_0)$, it is possible to detect the minimum value of the power of the cross point P using an electric Ratio Frequency (RF) spectrum analyzer.

Figure 11:
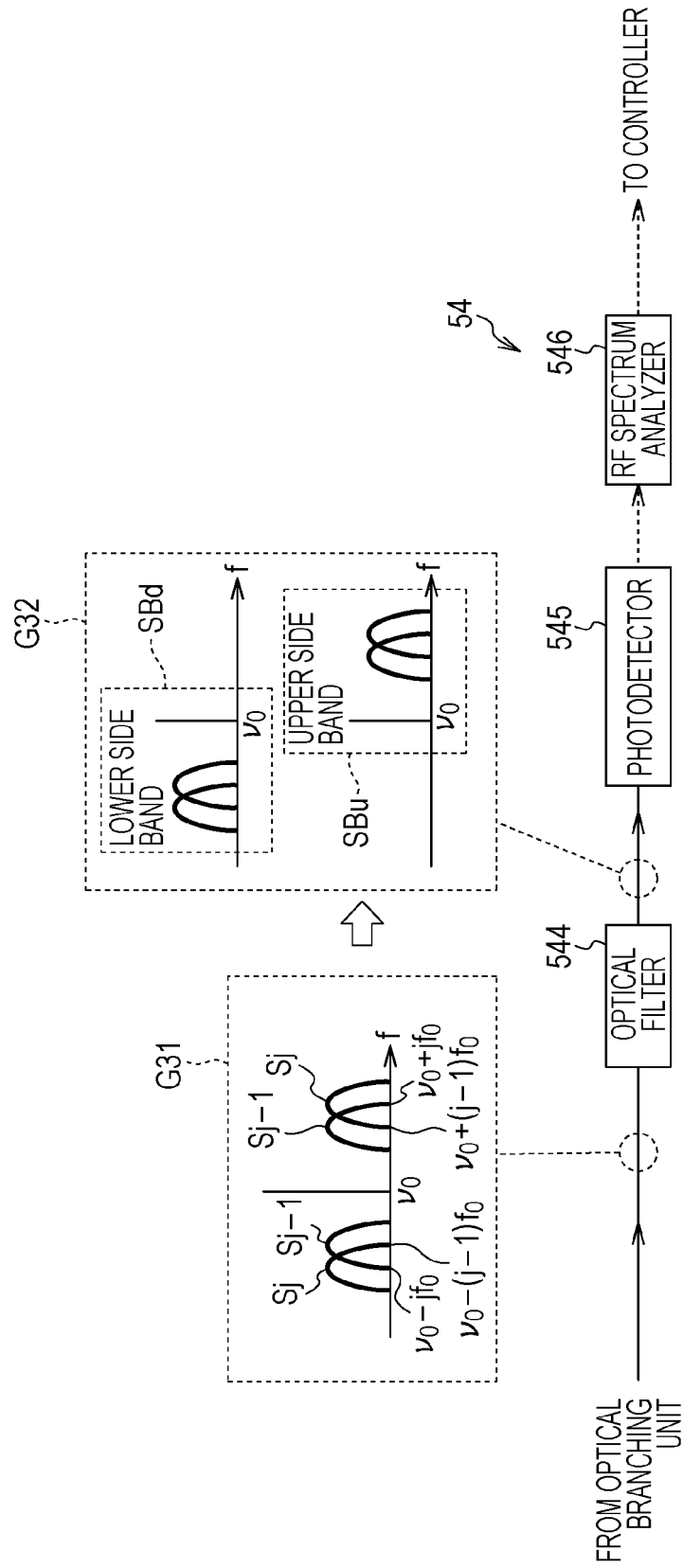
FIG. 11 is a configuration diagram illustrating another example of a monitor.

FIG. 11 is a configuration diagram illustrating another example of a monitor 54. The monitor 54 has an optical filter 544, a photodetector 545, and a RF spectrum analyzer 546. Moreover, in FIG. 11, in graphs G31 and G32, the horizontal axis illustrates an example of the optical spectrum as the frequency f.

A carrier light $v_0$ (see the graph G31) to which the sub-carrier signals Sj−1 and Sj are multiplexed is input from an optical branching unit 34 into the optical filter 544. In order to enable detection of intensity by the photodetector 545 of the subsequent stage, the optical filter 544 extracts an upper sideband SBu or a lower sideband SBd from the carrier light $v_0$ to which the sub-carrier signals Sj−1 and Sj are multiplexed (see the graph G32). For example, if the carrier light $v_0$ to which the sub-carrier signals Sj−1 and Sj are multiplexed is input into the photodetector 545 as it is, since the upper sideband SBu or the lower sideband SBd is phase-inverted to each other, the carrier light $v_0$ appears as a continuous wave and the photodetector 545 may not detect the intensity.

The photodetector 545 detects the intensity by converting the upper sideband SBu or the lower sideband SBd into the electrical signal. At this time, the center frequencies $v_0+(j−1)f_0$ and $v_0+jf_0$ of the sub-carrier signals Sj−1 and Sj are within an operation band of the photodetector 545. The RF spectrum analyzer 546 notifies the power of the cross point P to the controller 53 by detecting the power of the cross point P.

Furthermore, if the frequency band of the sub-carrier signals Sj−1 and Sj are out of the operation band of the photodetector 545 and the RF spectrum analyzer 546, the frequency bands of the sub-carrier signals Sj−1 and Sj may be converted into a low frequency band using the locally emitted light.

Figure 12:
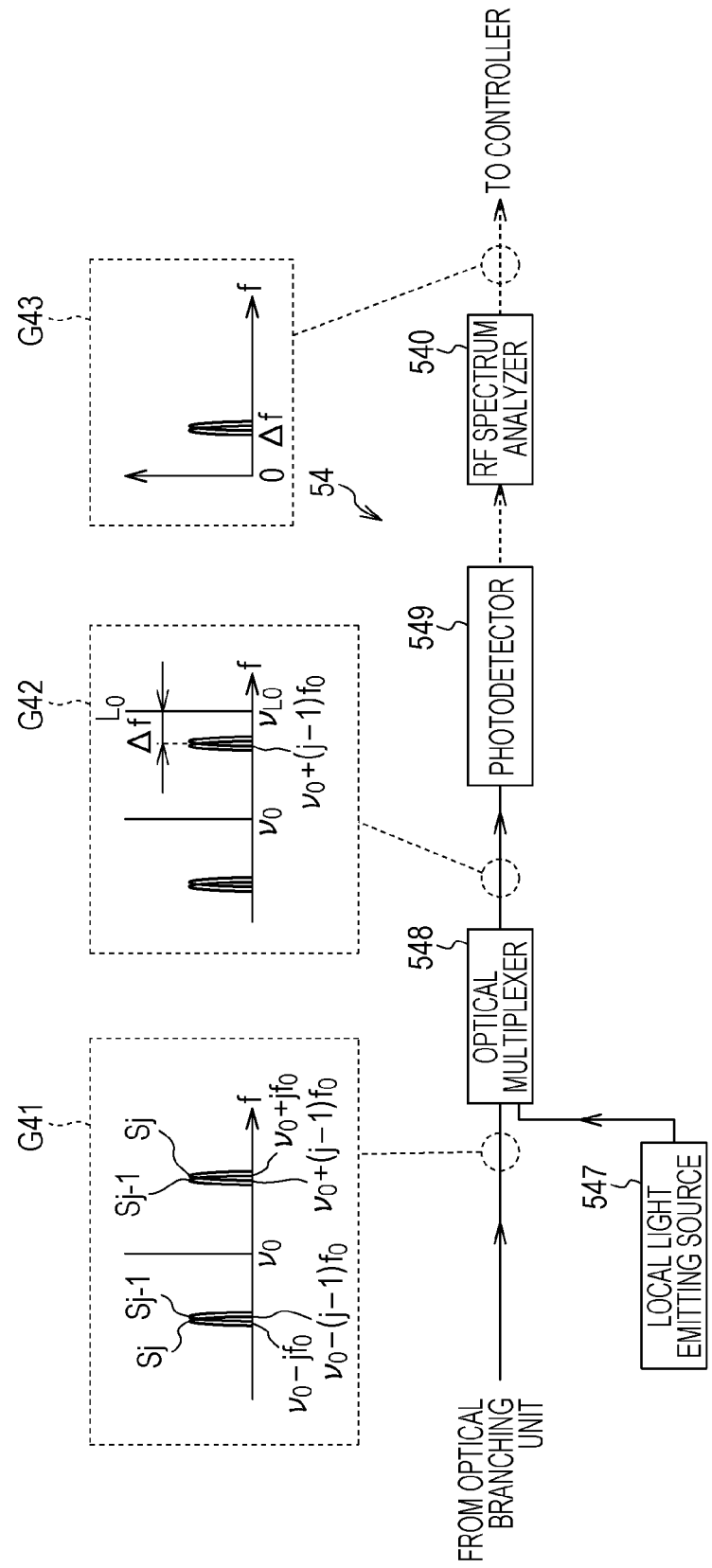
FIG. 12 is a configuration diagram illustrating still another example of a monitor.

FIG. 12 is a configuration diagram illustrating another example of a monitor 54. The monitor 54 has a local light emitting source 547, an optical multiplexer 548, a photodetector 549, and a RF spectrum analyzer 540. Moreover, in FIG. 12, in graphs G41 to G43, an example of the spectrum is illustrated in which the horizontal axis is the frequency f.

The local light emitting source 547 outputs a locally emitted light $L_0$ of a frequency $v_{L0}$ to the optical multiplexer 548. The locally emitted light $L_0$ is input from the local light emitting source 547, and the carrier light $v_0$ (see graph G41) to which the sub-carrier signals Sj−1 and Sj are multiplexed is input from the optical branching unit 34. For example, the optical multiplexer 548 is an optical coupler. The carrier light $v_0$ to which the locally emitted light $L_0$ and the sub-carrier signals Sj−1 and Sj are multiplexed (see the graph G42) by the optical multiplexer 548 and is input into the photodetector 549.

For example, if the upper sideband is detected, the frequency $v_{L0}$ of the locally emitted light $L_0$ is set in a position spaced at a spacing Δf from the center frequency $v_0+(j−1)f_0$ of the sub-carrier signal Sj−1. Here, the spacing Δf is a value within the operation band of the photodetector 549 and the RF spectrum analyzer 540. Thus, the frequency bands of the sub-carrier signals Sj−1 and Sj are converted into the low frequency band (see the graph G43) and the RF spectrum analyzer 546 may detect the power of the cross point P. The detected power is notified to a controller 53.

Figure 13:
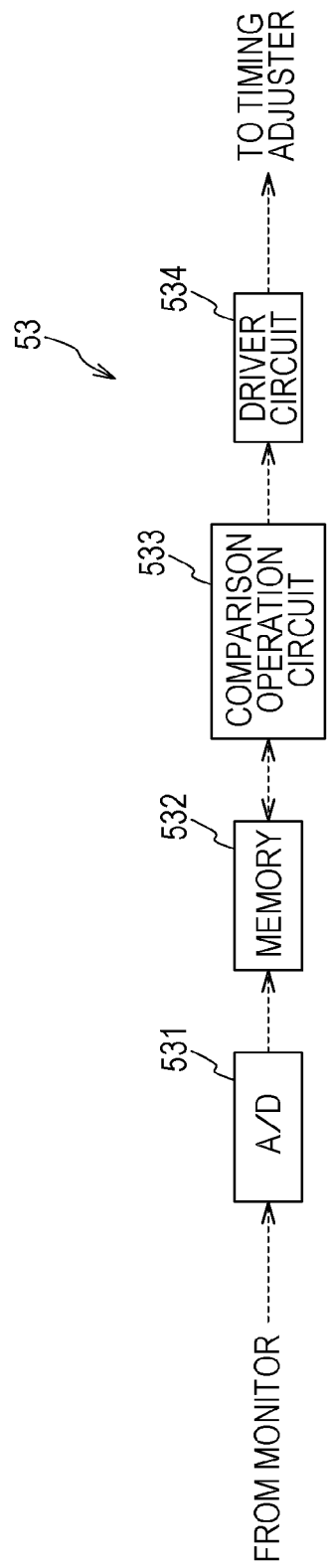
FIG. 13 is a configuration diagram illustrating an example of a controller.

FIG. 13 is a configuration diagram illustrating an example of a controller 53. The controller 53 has an analog/digital converting section (A/D) 531, a memory 532, a comparison operation circuit 533, a driver circuit 534. Moreover, another storage unit such as a hard disk drive may be used instead of the memory 532.

The analog/digital converting section 531 converts a detection signal input from a monitor 54 into a digital signal by sampling and records the power of the cross point P in the memory 532. The comparison operation circuit 533 reads the power of the cross point P from the memory 532, compares the power of the cross point P with power that is read in the last time, and outputs a comparison result to the driver circuit 534.

The driver circuit 534 generates a control signal Sc depending on an input comparison result and out the result to a timing adjuster 51. As described above, the control signal Sc represents a delay time of an output timing of a data signal. If the power of the cross point P is the minimum value, or is below a predetermined threshold Pth (value close to the minimum value), the driver circuit 534 fixes the delay time. Moreover, for example, the DSP is used as the comparison operation circuit 533 and the driver circuit 534.

As described above, the controller 53 controls the timing of the data symbol of the sub-carrier signal Sj depending on the power detected by the monitor 54. Thus, the optical OFDM signal in which the interference between the sub-carrier signals Sj−1 and Sj is suppressed is generated.

Since the interference between the sub-carrier signals Sj−1 and Sj occurs until the delay time is fixed, the communication quality is decreased. Thus, a training period of the sub-carrier signals Sj−1 and Sj is provided until the delay time is fixed and communication service may be stopped during the training period. In this case, for example, a signal generator 52 outputs idle data having a fixed pattern as the data signal to an optical modulator 46 during the training period and after completion of the training period, the data signal may be switched into a main signal (user data) from the idle data. Thus, occurrence of an error of the main signal may be reduced.

Figure 14:
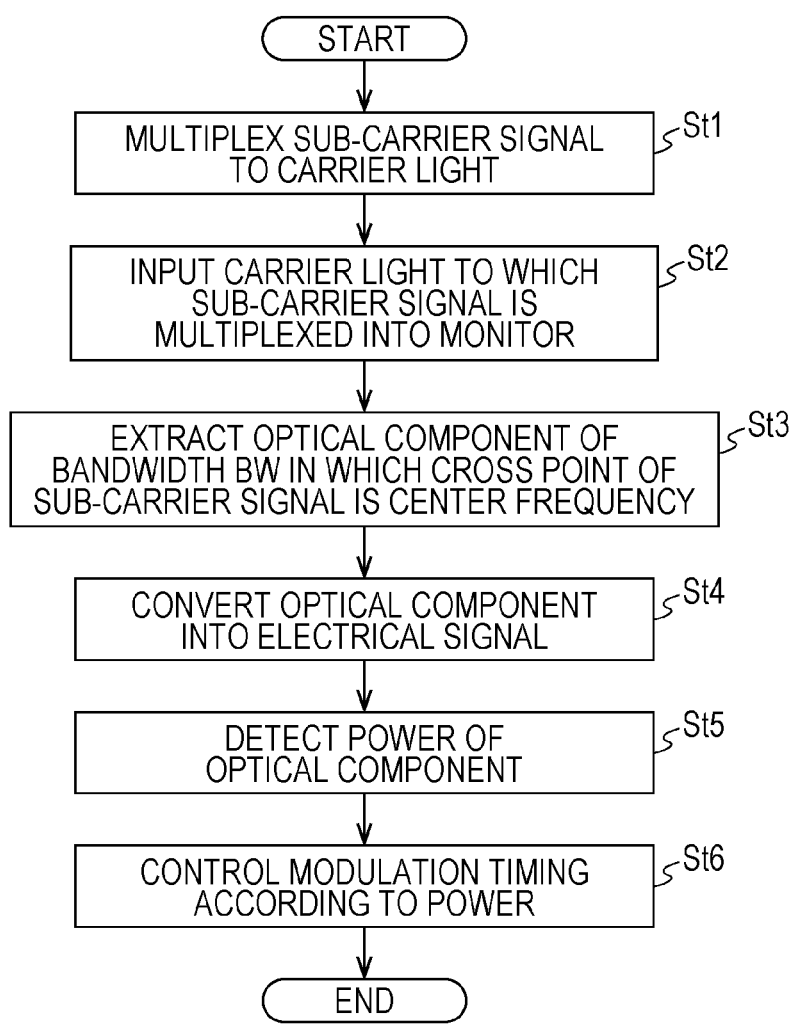
FIG. 14 is a flowchart illustrating a method of generating an optical OFDM signal according to an embodiment.

FIG. 14 is a flowchart illustrating a method of generating an optical OFDM signal according to the embodiment. The method of generating an optical OFDM signal using the optical multiplexing device 1 described above will be described.

First, the optical multiplexing device 1 multiplexes the sub-carrier signal Sj modulated in a predetermined symbol rate B based on the data signal to the carrier light $v_0$ to which the sub-carrier signal Sj−1 is multiplexed so as to be adjacent to the sub-carrier signal Sj−1 (operation St1). Next, the optical multiplexing device 1 inputs the carrier light $v_0$ to which the sub-carrier signals Sj−1 and Sj are multiplexed into the monitor 54 (operation St2).

Next, the optical filter 541 of the monitor 54 extracts the optical components Fu and Fd including the frequency component of the cross point P between the spectra of the sub-carrier signals Sj−1 and Sj from the input carrier light $v_0$ (operation St3). The optical components Fu and Fd have the bandwidth BW of a predetermined symbol rate B or less. Next, the photodetector 542 detects the intensity of the wave by converting the optical components Fu and Fd into the electrical signal (operation St4).

Next, the power meter 543 detects the power of the optical components Fu and Fd (operation St5). Next, the controller 53 controls the timing of the data symbol of the sub-carrier signal Sj, that is, the modulation timing depending on the detected power (operation St6). Thus, the optical OFDM signal is generated.

Next, a control process of the modulation timing by the controller 53 will be described.

Figure 15:
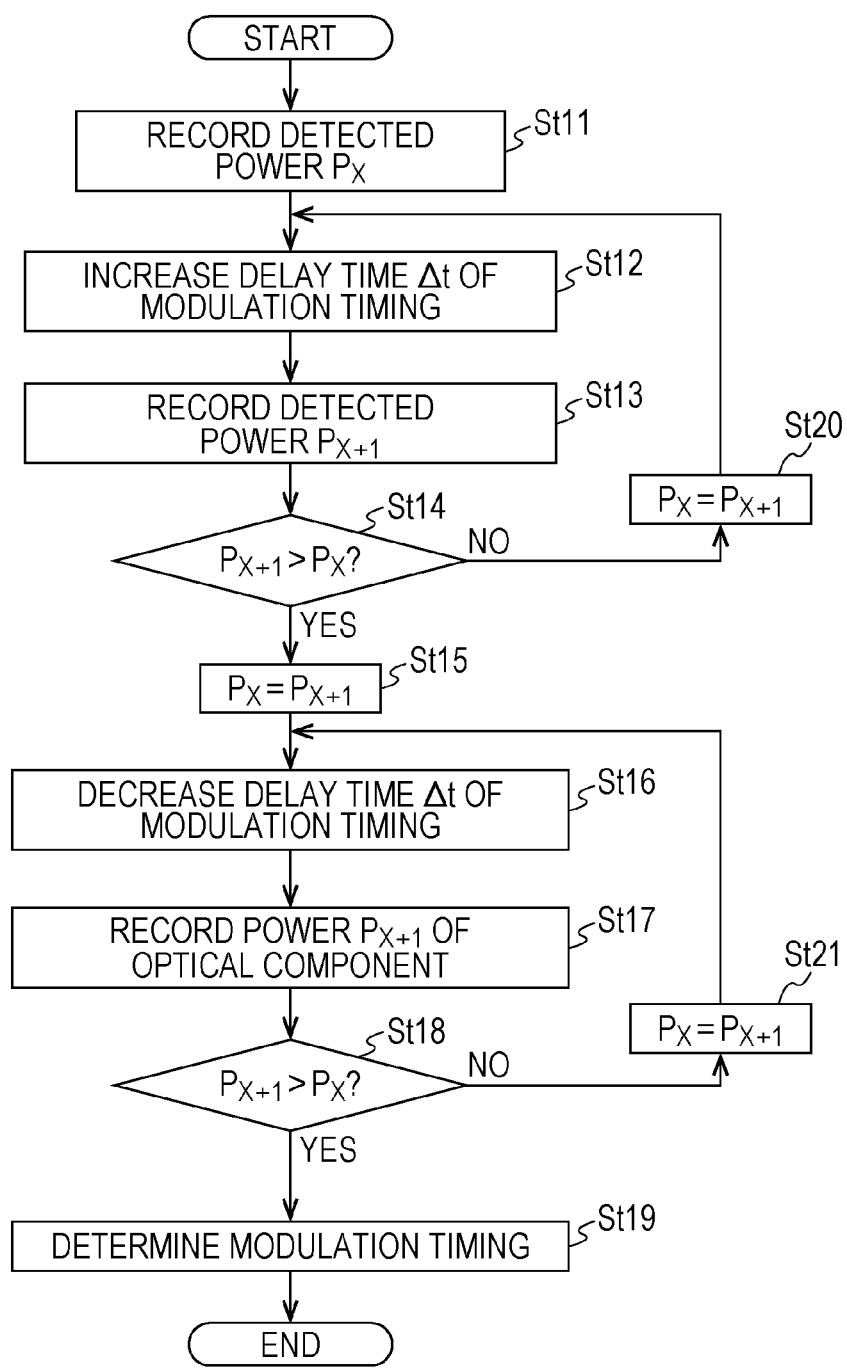
FIG. 15 is a flowchart illustrating an example of a control process of a modulation timing.

FIG. 15 is a flowchart illustrating an example of the control process of the modulation timing. In the example, in the controller 53, the modulation timing in which the power of the cross point P is the minimum value is detected by sampling the powers $P_X$ and $P_{X+1}$ of the cross point P while changing the delay time Δt of the output timing of the data signal, that is, the modulation timing.

First, the analog/digital converting section 531 records the power $P_X$ detected by the monitor 54 in the memory 532 (operation St11). Next, the driver circuit 534 increases the delay time Δt of the modulation timing in the timing adjuster 51 (operation St12).

Next, the analog/digital converting section 531 records the power $P_{X+1}$ detected by the monitor 54 in the memory 532 (operation St13). Next, the comparison operation circuit 533 compares the power $P_{X+1}$ with the power $P_X$ detected in the last time (operation St14).

If $P_{X+1} \leq P_X$ (No in operation St14), the driver circuit 534 makes $P_X = P_{X+1}$ (operation St20) and increases the delay time Δt of the modulation timing again (operation St12). In this case, since a detection point of the power $P_{X+1}$ is present in a negative region (Δt/T<0) of FIG. 5B, the driver circuit 534 controls the power so as to be close to the minimum value (Δt/T=0) by increasing the delay time Δt of the modulation timing.

Meanwhile, if $P_{X+1} > P_X$ (Yes in operation St14), the driver circuit 534 makes $P_X = P_{X+1}$ (operation St15) and decreases the delay time Δt of the modulation timing (operation St16). In this case, since the detection point of the power $P_{X+1}$ is present in a positive region (Δt/T>0) of FIG. 5B, the driver circuit 534 controls the power so as to be close to the minimum value (Δt/T=0) by decreasing the delay time Δt of the modulation timing.

Next, the analog/digital converting section 531 records the power $P_{X+1}$ detected by the monitor 54 in the memory 532 (operation St17). Next, the comparison operation circuit 533 compares the power $P_{X+1}$ with the power $P_X$ detected in the last time (operation St18).

If $P_{X+1} \leq P_X$ (No in operation St18), the driver circuit 534 makes $P_X = P_{X+1}$ (operation St21) and decreases the delay time Δt of the modulation timing again (operation St16). In this case, since the detection point of the power $P_{X+1}$ is present in the positive region of FIG. 5B, the driver circuit 534 controls the power so as to be close to the minimum value by decreasing the delay time Δt of the modulation timing.

Meanwhile, if $P_{X+1} > P_X$ (Yes in operation St18), the driver circuit 534 fixes the delay time Δt of the modulation timing (operation St19). In this case, since the detection point of the power $P_{X+1}$ enters the negative region from the positive region of FIG. 5B, the driver circuit 534 determines that the minimum value of the power is detected, fixes the delay time Δt of the modulation timing, and the control is finished. Thus, the control process of the modulation timing is performed.

As described above, the controller 53 controls the modulation timing of the sub-carrier signal Sj so that power detected by the monitor 54 is the minimum value. Thus, the interference between the sub-carrier signals Sj−1 and Sj is effectively reduced.

Furthermore, the controller 53 is not limited to the control method described above and the modulation timing of the sub-carrier signal Sj may be controlled so that the power detected by the monitor 54 is less than a predetermined threshold Pth.

Figure 16:
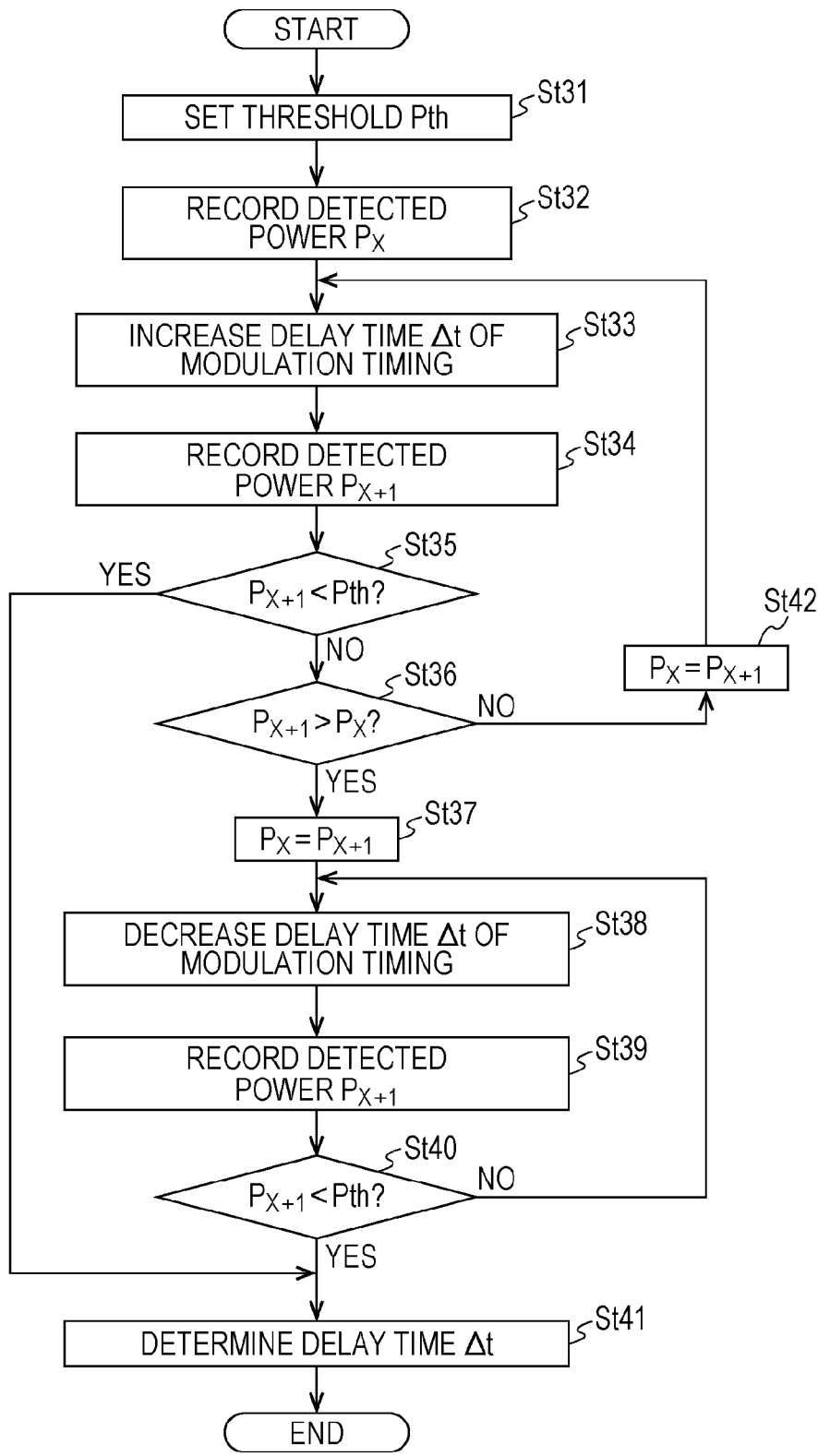
FIG. 16 is a flowchart illustrating another example of a control process of modulation timing.

FIG. 16 is a flowchart illustrating another example of a control process of the modulation timing. First, the driver circuit 534 sets the threshold Pth according to an instruction from a network control device and the like (operation St31). Since the delay time (timing difference of the data symbol) Δt of the modulation timing is different depending on the modulation system, for example, the threshold Pth is determined based on the modulation system. Moreover, the threshold Pth may be determined based on the minimum value of the power obtained by the control process illustrated in FIG. 15.

Next, the analog/digital converting section 531 records the power $P_X$ detected by the monitor 54 in the memory 532 (operation St32). Next, the driver circuit 534 increases the delay time Δt of the modulation timing in the timing adjuster 51 (operation St33).

Next, the analog/digital converting section 531 records the power $P_{X+1}$ detected by the monitor 54 in the memory 532 (operation St34). Next, the comparison operation circuit 533 compares the power $P_{X+1}$ with the threshold Pth (operation St35). If $P_X <$ Pth (Yes in operation St35), the driver circuit 534 fixes the delay time Δt of the modulation timing (operation St41). Thus, the control process is finished.

Meanwhile, if $P_X$ Pth (No in operation St35), the comparison operation circuit 533 compares the power $P_{X+1}$ with the power $P_X$ detected in the last time (operation St36).

If $P_{X+1} \leq P_X$ (No in operation St36), the driver circuit 534 makes $P_X = P_{X+1}$ (operation St42) and increases the delay time Δt of the modulation timing again (operation St33). In this case, since the detection point of the power $P_{X+1}$ is present in the negative region of FIG. 5B, the driver circuit 534 controls the power so as to be close to the minimum value by increasing the delay time Δt of the modulation timing.

Meanwhile, if $P_{X+1} > P_X$ (Yes in operation St36), the driver circuit 534 makes $P_X = P_{X+1}$ (operation St37) and decreases the delay time Δt of the modulation timing again (operation St38). In this case, since the detection point of the power $P_{X+1}$ is present in the positive region of FIG. 5B, the driver circuit 534 controls the power so as to be close to the minimum value (Δt/T=0) by decreasing the delay time Δt of the modulation timing.

Next, the analog/digital converting section 531 records the power $P_{X+1}$ detected by the monitor 54 in the memory 532 (operation St39). Next, the comparison operation circuit 533 compares the power $P_{X+1}$ with the threshold Pth (operation St40). If $P_X$ Pth (No in operation St40), the comparison operation circuit 533 decreases the delay time Δt of the modulation timing again (operation St38).

Meanwhile, if $P_{X+1} <$ Pth (Yes in operation St40), the driver circuit 534 fixes the delay time Δt of the modulation timing (operation St41). Thus, the control process is finished.

In the example, the controller 53 controls the modulation timing of the sub-carrier signal Sj so that the power detected by the monitor 54 is less than a predetermined threshold Pth. Thus, a time desirable to fix the delay time Δt of the modulation timing is reduced compared to the example of FIG. 15. Furthermore, the threshold Pth is set depending on the modulation system of the sub-carrier signal Sj and thereby it is possible to optimize the control process.

As described above, the optical multiplexing device 1 according to the embodiment generates the optical OFDM signal by multiplexing the second sub-carrier signal Sj so as to be adjacent to the first sub-carrier signal Sj−1. The optical multiplexing device 1 has the detection section (monitor) 54 and the controller 53.

The detection section 54 extracts the optical components Fu and Fd including the frequency component of the cross point P between the spectra of the first sub-carrier signal Sj−1 and the second sub-carrier signal Sj from the optical OFDM signal and detects the power of the optical components Fu and Fd. The controller 53 controls the timing of the data symbol of the second sub-carrier signal Sj depending on the power detected by the detection section 54.

According to the configuration described above, the detected optical components Fu and Fd include the frequency component of the cross point P between the spectra of the first sub-carrier signal Sj−1 and the second sub-carrier signal Sj. Furthermore, the controller 53 controls the modulation timing of the second sub-carrier signal Sj according to the power of the optical components Fu and Fd detected by the detection section 54.

Thus, according to the optical multiplexing device 1 of the embodiment, it is possible to generate the optical OFDM signal in which the interference between the sub-carrier signals Sj−1 and Sj is suppressed.

Furthermore, the method of generating an optical OFDM signal according to the embodiment is a method of generating the optical OFDM signal by multiplexing the second sub-carrier signal Sj so as to be adjacent to the first sub-carrier signal Sj−1. The method of generating an optical OFDM signal includes the following operations.

Operation (1): extracting the optical components Fu and Fd including the frequency component of the cross point P between the spectra of the first sub-carrier signal Sj and the second sub-carrier signal Sj−1 from the optical OFDM signal. Operation (2): detecting the power of the optical components Fu and Fd. Operation (3): controlling the timing of the data symbol of the second sub-carrier signal Sj−1 depending on the detected power.

Since the method of generating an optical OFDM signal according to the embodiment includes the configuration similar to that of the optical multiplexing device 1 described above, the operational effects similar to the contents described above are achieved.

The embodiments described above are preferable examples. However, the embodiments are not limited to the examples and various modifications may be implemented within the scope not departing from the gist of the disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical multiplexing device comprising:
   a monitor configured to detect power of an optical component including a frequency component of a cross point between spectra of a first sub-carrier signal and a second sub-carrier signal; and
   a controller configured to control a modulation timing of a data symbol of the second sub-carrier signal according to the power detected by the monitor,
   wherein the second sub-carrier signal is multiplexed to a carrier to be adjacent to the first sub-carrier signal multiplexed to the carrier so as to generate an optical Orthogonal Frequency Divisional Multiplexing (OFDM) signal in which an interference between the first and second sub-carrier signals is suppressed.

2. The optical multiplexing device according to claim 1, wherein the monitor includes
   an optical filter configured to extract the optical component including the frequency component of the cross point between the spectra of the first sub-carrier signal and the second sub-carrier signal, and
   a photodetector configured to detect power of the optical component transmitted through the optical filter.

3. The optical multiplexing device according to claim 2, wherein the first sub-carrier signal and the second sub-carrier signal are respectively modulated at a symbol rate having a predetermined frequency spacing based on a data signal to be transmitted, and
   wherein the optical filter extracts the optical component having a bandwidth of the symbol rate or less.

4. A method of generating an optical Orthogonal Frequency Divisional Multiplexing (OFDM) signal, the method comprising:
   detecting an optical component including a frequency component of a cross point between spectra of a first sub-carrier signal and a second sub-carrier signal; and
   controlling a modulation timing of a data symbol of the second sub-carrier signal according to the detected power so that the second sub-carrier signal is multiplexed to a carrier to be adjacent to the first sub-carrier signal multiplexed to the carrier to generate the OFDM signal in which an interference between the first and second sub-carrier signals is suppressed.

5. The method of generating an optical OFDM signal according to claim 4, further comprising:
   extracting the optical component including the frequency component of the cross point between the spectra of the first sub-carrier signal and the second sub-carrier signal; and
   detecting power of the extracted optical component.

6. The method of generating an optical OFDM signal according to claim 5,
   wherein the first sub-carrier signal and the second sub-carrier signal are respectively modulated at a symbol rate having a predetermined frequency spacing based on a data signal to be transmitted, and
   wherein the optical component having a bandwidth of the symbol rate or less is extracted.

7. An apparatus for generating an optical Orthogonal Frequency Divisional Multiplexing (OFDM) signal, the apparatus comprising:
   means for detecting an optical component including a frequency component of a cross point between spectra of a first sub-carrier signal and a second sub-carrier signal; and
   means for controlling a modulation timing of a data symbol of the second sub-carrier signal according to the detected power so that the second sub-carrier signal is multiplexed to a carrier to be adjacent to the first sub-carrier signal multiplexed to the carrier to generate the OFDM signal in which an interference between the first and second sub-carrier signals is suppressed.

* * * * *